United States Patent
Dambe et al.

(10) Patent No.: US 12,099,514 B2
(45) Date of Patent: Sep. 24, 2024

(54) TRANSFORMING DATA METRICS TO MAINTAIN COMPATIBILITY IN AN ENTERPRISE DATA WAREHOUSE

(71) Applicant: Chime Financial, Inc., San Francisco, CA (US)

(72) Inventors: Karishma Dambe, Fremont, CA (US); Dmytro Manannykov, Pleasanton, CA (US); Saiyad Shah, Pleasanton, CA (US)

(73) Assignee: Chime Financial, Inc., San Francisco, CA (US)

( * ) Notice: Subject to any disclaimer, the term of this patent is extended or adjusted under 35 U.S.C. 154(b) by 0 days.

(21) Appl. No.: 18/172,093

(22) Filed: Feb. 21, 2023

(65) Prior Publication Data

US 2024/0281451 A1     Aug. 22, 2024

(51) Int. Cl.
*G06F 17/00* (2019.01)
*G06F 16/23* (2019.01)
*G06F 16/25* (2019.01)

(52) U.S. Cl.
CPC ........ *G06F 16/254* (2019.01); *G06F 16/2365* (2019.01)

(58) Field of Classification Search
CPC ........ G06F 16/13; G06F 16/24; G06F 16/156; G06N 3/00; G06N 5/00; G05B 13/00
See application file for complete search history.

(56) References Cited

U.S. PATENT DOCUMENTS

| | | | | |
|---|---|---|---|---|
| 7,139,779 | B1* | 11/2006 | Kornelson | G06F 16/283 707/999.203 |
| 7,231,403 | B1* | 6/2007 | Howitt | H04L 51/222 |
| 10,387,554 | B1* | 8/2019 | Li | G06F 40/166 |
| 11,544,285 | B1* | 1/2023 | Govil | G06F 16/248 |
| 11,886,457 | B2* | 1/2024 | He | G06F 16/254 |
| 2002/0143783 | A1* | 10/2002 | Bakalash | G06F 16/30 |
| 2003/0009295 | A1* | 1/2003 | Markowitz | G16B 50/00 435/6.13 |
| 2003/0055835 | A1* | 3/2003 | Roth | G16B 50/00 707/999.102 |
| 2006/0026199 | A1* | 2/2006 | Crea | G06F 16/254 |
| 2006/0173926 | A1* | 8/2006 | Kornelson | G06F 16/258 |
| 2009/0281985 | A1* | 11/2009 | Aggarwal | G06F 16/254 |

(Continued)

OTHER PUBLICATIONS

Alan Simon, Chapter 6—Program Key Performance Indicators (KPIs) and Key Operating Indicators (KOIs), Enterprise Business Intelligence and Data Warehousing, Morgan Kaufmann, 2015, pp. 65-72, ISBN 9780128015407, https://doi.org/10.1016/B978-0-12-801540-7.00006-8.

(Continued)

*Primary Examiner* — Hung D Le
(74) *Attorney, Agent, or Firm* — Keller Preece PLLC

(57) ABSTRACT

The present disclosure relates to systems, non-transitory computer-readable media, and methods for transforming data metrics to conform to a production schema for cross-domain uniformity. In particular, in one or more embodiments, the disclosed systems receive a metric having an initial schema, determine that the initial schema is inconsistent with a production schema, transform the metric to conform with the production schema, and store the metric in a standardized-schema database.

20 Claims, 10 Drawing Sheets

(56) References Cited

U.S. PATENT DOCUMENTS

| | | | |
|---|---|---|---|
| 2013/0013584 A1* | 1/2013 | O'Byrne | G06F 16/284 |
| | | | 707/E17.017 |
| 2015/0293980 A1* | 10/2015 | Dola | G06F 21/60 |
| | | | 726/26 |
| 2018/0129684 A1* | 5/2018 | Wilson | G06F 16/254 |
| 2018/0232404 A1* | 8/2018 | Bhatti | G06F 16/9024 |
| 2021/0042278 A1* | 2/2021 | Takada | G06F 11/3452 |
| 2021/0117437 A1* | 4/2021 | Gibson | G06F 16/258 |
| 2023/0281213 A1* | 9/2023 | Kumar | G06F 16/24542 |
| | | | 707/602 |

OTHER PUBLICATIONS

Chapter 10—SQL Server Analysis Services, Editor(s): Robert A. Patton, Jennifer Ogle, Travis Laird, Designing SQL Server 2000 Databases, Syngress, 2001, pp. 453-498, ISBN 9781928994190, https://doi.org/10.1016/B978-192899419-0/50013-0.

Charles D. Tupper, 19—Dimensional Warehouses from Enterprise Models, 2011, pp. 337-356, ISBN 9780123851260, https://doi.org/10.1016/B978-0-12-385126-0.00019-X.

Han et al., 4—Data Warehousing and Online Analytical Processing, In The Morgan Kaufmann Series in Data Management Systems, Data Mining (Third Edition), Morgan Kaufmann, 2012, pp. 125-185, ISBN 9780123814791, https://doi.org/10.1016/B978-0-12-381479-1.00004-6.

Hobbs et al, 15—OLAP, Oracle 10g Data Warehousing, Digital Press, 2005, pp. 671-724, ISBN 9781555583224, https://doi.org/10.1016/B978-155558322-4/50017-5.

Lilian Hobbs et al., 8—Dimensions, Oracle 10g Data Warehousing, Digital Press, 2005, pp. 367-382, ISBN 9781555583224, https://doi.org/10.1016/B978-155558322-4/50010-2.

Rick F. van der Lans, Chapter 11—Data Virtualization, Information Management, and Data Governance, In MK Series on Business Intelligence, Data Virtualization for Business Intelligence Systems, Morgan Kaufmann, 2012, pp. 231-241, ISBN 9780123944252, https://doi.org/10.1016/B978-0-12-394425-2.00011-3.

Rick F. van der Lans, Chapter 2—Business Intelligence and Data Warehousing, Editor(s): Rick F. van der Lans, In MK Series on Business Intelligence, Data Virtualization for Business Intelligence Systems, Morgan Kaufmann, 2012, pp. 27-57, ISBN 9780123944252, https://doi.org/10.1016/B978-0-12-394425-2.00002-2.

Rick Sherman, Chapter 9—Dimensional Modeling, Business Intelligence Guidebook, Morgan Kaufmann, 2015, pp. 197-235, ISBN 9780124114616, https://doi.org/10.1016/B978-0-12-411461-6.00009-5.

Teorey et al., "10—Business Intelligence," Database Modeling and Design (Fifth Edition), The Morgan Kaufmann Series in Data Management Systems, 2011, pp. 189-231, webpage <https://doi.org/10.1016/B978-0-12-382020-4.00012-4>.

* cited by examiner

TRANSFORMING DATA METRICS TO MAINTAIN COMPATIBILITY IN AN ENTERPRISE DATA WAREHOUSE

BACKGROUND

Recent years have seen developments in data warehousing systems that store large amounts of data for enterprise decision-making. For example, existing data warehousing systems can stage data and load the data into a data warehouse for intelligent analytics. Despite recent advances, however, existing data warehousing systems continue to exhibit a number of drawbacks or deficiencies, particularly with regard to cross-domain uniformity, duplicative memory storage, and duplicative or contradictory messaging.

For instance, existing data warehousing systems cause data compatibility problems by storing data from various sources irrespective of the formatting of the data. Specifically, conventional systems receive and store enterprise data in a data warehouse having a single schema. Using this approach, conventional systems suffer from a lack of source control of data metrics, and have problems with integrating computing functionalities across the enterprise.

Additionally, conventional data warehousing systems receive and store duplicative data from multiple sources. Specifically, conventional systems are redundant in storing data metrics that repeat information. By creating unnecessary redundancy in storing data metrics-sometimes inadvertently creating tens, hundreds, or thousands of copies of certain data metrics-conventional systems inefficiently store and slow down the search of such data metrics. Also, by duplicating data storage, conventional systems suffer from unnecessary use of memory storage space.

Further, conventional data warehousing systems sometimes transmit duplicative and/or contradictory electronic communications when announcing the storage of a new data metric. Specifically, conventional systems suffer from the problem of transmitting incorrect notifications about stored data, and therefore must then transmit corrections that waste computing and network resources.

These, along with additional problems and issues, exist with conventional data warehousing systems.

BRIEF SUMMARY

This disclosure describes one or more embodiments of methods, non-transitory computer-readable media, and systems that can solve the foregoing problems in addition to providing other benefits. Particularly, the disclosed systems can provide new computing functionalities by integrating data domains into a uniform cross-domain enterprise data warehouse. For example, the disclosed systems can utilize data-domain specific production schemas to harmonize data metrics within an enterprise data warehouse. In some cases, the disclosed systems can determine that a data metric has a schema that is inconsistent with a production schema. The disclosed systems can transform the data metric to conform with the production schema. In this way, the disclosed systems can provide uniform metrics and reduce memory storage requirements by avoiding duplicative data metrics in databases. Further, the disclosed systems can reduce duplicative electronic communications by ensuring accurate data publication to an enterprise-wide standardized-schema database.

BRIEF DESCRIPTION OF THE DRAWINGS

The detailed description provides one or more embodiments with additional specificity and detail through the use of the accompanying drawings, as briefly described below.

DETAILED DESCRIPTION

Figure 1:
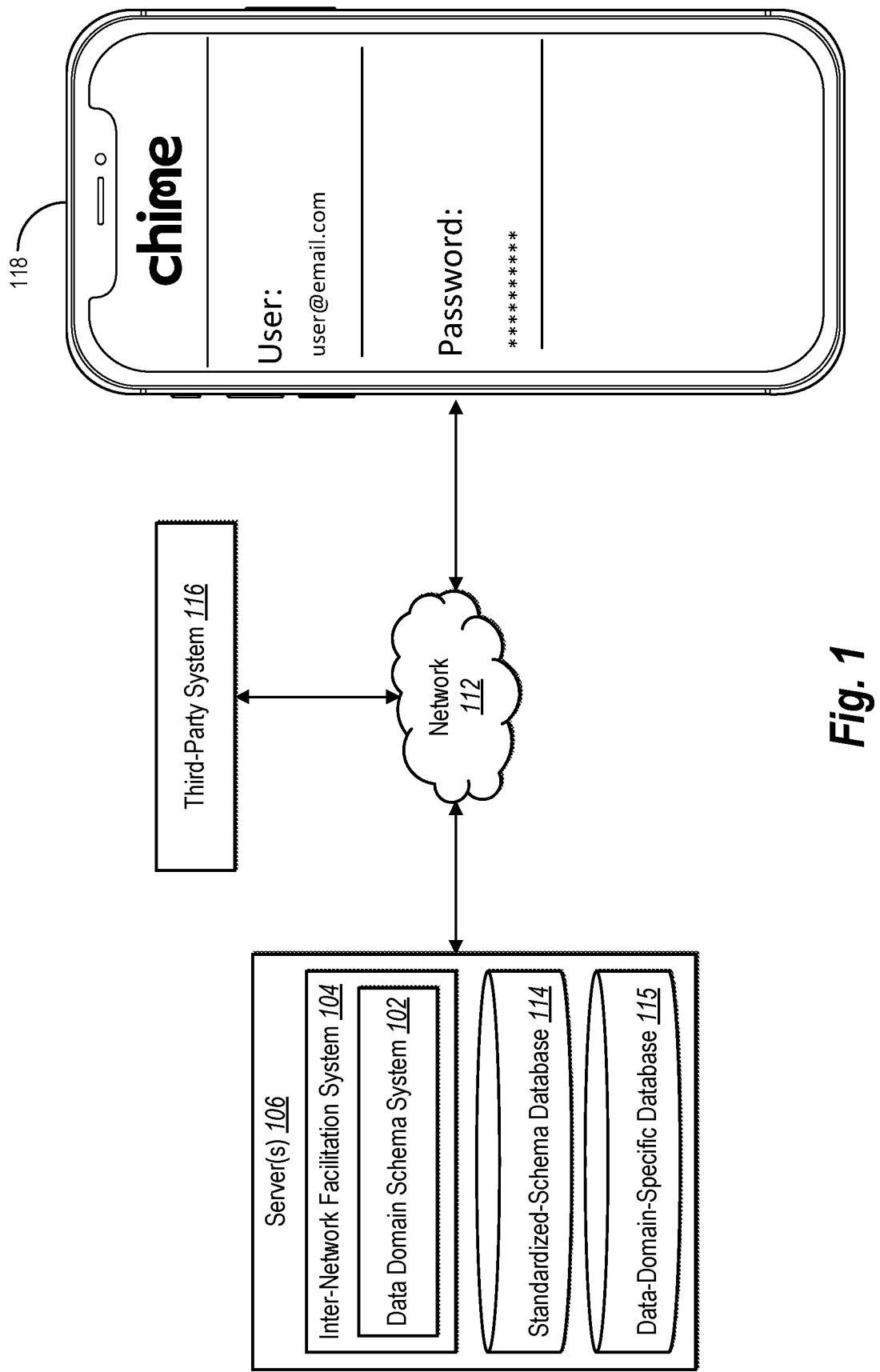
FIG. 1 illustrates a block diagram of an environment in which an inter-network facilitation system and a data domain schema system can operate in accordance with one or more embodiments.

This disclosure describes one or more embodiments of a data domain schema system. The data domain schema system harmonizes data across an enterprise to help ensure that the enterprise uses correct information in decision making. For example, the data domain schema system productionizes data metrics from multiple data domains to ensure that metrics are consistent and governed by appropriate arbiters of the various metrics. For instance, the data domain schema system receives a metric having an initial schema that corresponds to a first data domain. The data domain schema system then determines whether the initial schema is consistent with a production schema specific to that first data domain. In the event that the initial schema is inconsistent with the production schema specific to the first data domain, the data domain schema system transforms the metric to conform to the production schema specific to the first data domain. The data domain schema system then stores the metric in a standardized-schema database, such as a core database.

In some embodiments, the data domain schema system utilizes multiple data domains. For example, the data domain schema system communicates with a first data domain that is controlled by a finance division of an enterprise. The data domain schema system also communicates with a second data domain controlled by a risk division of the enterprise. The first data domain has a first data-domain-specific database that comprises metrics utilized by the finance division. The second data domain has a second data-domain-specific database that comprises metrics utilized by the risk division. The data domain schema system accesses the first and second data-domain-specific databases to receive metrics and transform the metrics to conform with production schemas pertaining to the respective data-domain-specific databases.

As mentioned, each data domain has an associated initial schema specific to the data domain. For instance, the data domain schema system has a first initial schema specific to the first data domain (e.g., finance), and a second initial schema specific to the second data domain (e.g., risk). The data domain schema system uses additional schemas in the process of developing metrics for enterprise-wide production. For example, the data domain schema system utilizes a first test schema specific to the first data domain to develop and test finance metrics associated with the first data domain. The data domain schema system likewise may utilize a second test schema specific to the second data domain to develop and test risk metrics associated with the second data domain. Further, the data domain schema system utilizes a first production schema specific to the first data domain to productionize the finance metrics associated with the first data domain. Likewise, the data domain schema system utilizes a second production schema specific to the second data domain to productionize the risk metrics associated with the second data domain.

In some embodiments, the data domain schema system utilizes a snowflake schema template to transform a metric. For example, the data domain schema system transforms a metric to conform to the first production schema by transforming the metric to conform with a first snowflake schema template corresponding with the first production schema. A snowflake schema template is a format for organizing data, including a central fact table and dimension tables having normalized data associated with data points in the central fact table or other dimension tables. To illustrate, the data domain schema system may receive a metric having an initial schema with one or more differing dimensions. The initial schema may be inconsistent with a production schema because the datapoints within the different dimensions must be normalized to match the production schema. Thus, the data domain schema system transforms the metric by normalizing the different dimensions within the metric. To achieve this, the data domain schema system may change the metric to conform with a snowflake schema that matches the production schema.

After transforming a metric to conform to a production schema, the data domain schema system stores the metric in a standardized-schema database. The standardized-schema database is a database where the data domain schema system stores all enterprise-wide accessible metrics. The enterprise-wide accessible metrics are accessible by any user device within the enterprise, subject to appropriate permissions settings.

As noted above, the data domain schema system stores metrics from various data-domain-specific databases into the standardized-schema database. Metrics from a first data-domain-specific database that are stored in the standardized-schema database have a first production schema specific to the first data domain. Metrics from a second data-domain-specific database that are stored in the standardized-schema database have a second production schema specific to the second data domain. Thus, the data domain schema system can apply appropriate transformations to metrics before storing the metrics in the standardized-schema database, based on the sources of the metrics. In this way, for example, the data domain schema system ensures that risk metrics are defined by a risk production schema, while finance metrics are defined by a finance production schema, etc. Thus, the data domain schema system provides cross-domain uniformity, while allowing for appropriate controls of the metrics by their respective responsible data domains.

The data domain schema system provides many advantages and benefits over conventional systems and methods. For example, by creating cross-domain uniformity, the data domain schema system provides new computing functionalities and improves data integrity across different domains or databases relative to conventional systems. Specifically, the data domain schema system exchanges and transforms data in ways that result in an easy-to-use and cross-compatible data warehouse, unlike conventional data systems. For example, the data domain schema system utilizes cross-domain uniform schemas to harmonize metrics into cross-domain uniform metrics. By transforming datasets and metrics having an initial schema associated with a particular data domain (such as a data domain belonging to a particular division or team within an enterprise) into a dataset or metric conforming to a production schema of that particular data domain, the data domain schema system facilitates quickly and efficiently updating datasets for enterprise-wide use independent of the particular initial schema. By providing a single source of truth for data metrics on which the enterprise makes decisions, the data domain schema system establishes data integrity for an enterprise that can be accessed by different domains and databases regardless of an initial domain schema.

Additionally, the data domain schema system reduces required memory storage space by avoiding duplicative databases across multiple domains. For instance, the data domain schema system prevents publication of duplicative metrics to the standardized-schema database from different data domains. For example, the finance division may have a metric representing a risk of fraud in a certain scenario, while the risk division has another metric representing the same risk of fraud in that scenario. The finance division's fraud metric and the risk's division's fraud metric may have different schemas, and may comprise different datapoints within the different schemas. In addition to this example of a metric stored in different schemas, in some cases, a metric may be stored tens, hundreds, or thousands of times in varying schemas across different domains or databases. Regardless of the number of occurrences for a stored metric or different initial schema, the data domain schema system assigns responsibility over the metric to one data domain (e.g., the risk division's data domain in the example of the metric representing the risk of fraud) and productionizes that data domain's metric by transforming the metric to conform to the production schema of the responsible data domain. The data domain schema system then stores the production-ready metric in the standardized-schema database, at which point the metric is accessible by other data domains. In this way, the data domain schema system maintains a clean, organized standardized-schema database with complete data. The data domain schema system thus reduces duplicative memory use, thereby obviating storage of metrics in the tens, hundreds, or thousands of times and saving memory storage space.

Further, the data domain schema system increases efficiency of computing systems by avoiding duplicative and contradictory electronic communications. For example, the data domain schema system publishes notifications across the enterprise's computing devices (or to a subset of the enterprise's computing devices), communicating the publication of stored metrics within the standardized-schema database. By ensuring that the stored metrics are production-ready, the data domain schema system prevents incorrect messages, such as errant notifications that a stored metric is ready for access.

As illustrated by the foregoing discussion, the present disclosure utilizes a variety of terms to describe features and advantages of the data domain schema system. Additional detail is now provided regarding the meaning of such terms. For example, as used herein, the term "data metric" (or "metric") refers to a parameter, an object, a table, an array, or a dataset. In particular, the term "metric" can include information stored in a dataset that a computing device within an enterprise or a data domain can look up and access from a data domain workspace. To illustrate, a metric can include analytics, financials, prices, rates, and measurements associated with a data domain.

As used herein, the term "data domain" refers to a logical entity that serves a division, team, or group. In particular, the term "data domain" can include an organizational structure of data that is controlled by computing devices within the division, team, or group. To illustrate, a data domain can include a finance data domain, a risk data domain, a lending data domain, and a research data domain within an enterprise or within a set of computing devices that share common folders or a common domain.

As used herein, the term "data-domain-specific database" refers to a repository of data that serves a data domain. In particular, the term "data-domain-specific database" can include a storage medium accessible and controllable within the data domain. To illustrate, a data-domain-specific database can include a finance data domain database, a risk data domain database, a lending data domain database, and a research data domain database.

As used herein, the term "ingestion database" refers to a repository into which data can be loaded from sources external to an enterprise or across a set of computing devices that share common folders or a common domain. In particular, the term "ingestion database" can include a storage medium accessible by the data domain schema system, that serves as an intermediate storage repository for data from outside providers. To illustrate, an ingestion database can include a MySQL database, a Fivetran database, a Segment database, and a PostgreSQL database.

As used herein, the term "staging database" refers to a repository in which data can be temporarily stored prior to loading into a standardized-schema database. In particular, the term "staging database" can include a storage medium in which data metrics can be inspected to verify that they conform with appropriate schemas before being transferred into the standardized-schema database.

As used herein, the term "standardized-schema database" refers to a repository of production-quality data, accessible across an enterprise or across a set of computing devices that share common folders or a common domain. In particular, the term "standardized-schema database" can include a database that serves the enterprise (or a set of computing devices that share common folders or a common domain) as a single source of truth for numerous data points, containing data metrics that can be relied upon for decision-making. To illustrate, a standardized-schema database can include a core database.

As used herein, the term "initial schema" refers to an initial rule set or formula set (e.g., integrity constraints) defining the organization of computer data. In particular, the term "initial schema" can include computer code defining an initial digital blueprint of organizational parameters for a digital payload. As an example, an initial schema can be a denormalized format or a different format of data tables or data metrics.

As used herein, the term "test schema" refers to a schema for conducting tests, data research, and/or data experiments. In particular, the term "test schema" can include a rule set, formula set, or computer code defining the organizational format of data undergoing development. To illustrate, a test schema can include an initial schema used for creating and developing data metrics within a data domain.

As used herein, the term "production schema" refers to a final rule set or formula set defining the organization of computer data in a state ready for publication to a standardized-schema database. In particular, the term "production schema" can include computer code defining a finalized (e.g., productionized) digital blueprint of organizational parameters for a digital payload. As an example, a production schema can be a normalized format of data tables or data metrics.

Additional detail regarding the data domain schema system will now be provided with reference to the figures. In particular, FIG. 1 illustrates a block diagram of a system environment for implementing a data domain schema system 102 in accordance with one or more embodiments. As shown in FIG. 1, the environment includes server(s) 106 housing the data domain schema system 102 as part of an inter-network facilitation system 104. The environment of FIG. 1 further includes a client device 118 and a third-party system 116. In some embodiments, the environment includes additional systems connected to the inter-network facilitation system 104, such as a credit processing system, an ATM system, or a merchant card processing system. The server(s) 106 can include one or more computing devices to implement the data domain schema system 102. The server(s) 106 can include databases, such as a standardized-schema database 114 and a data-domain-specific database 115. Additional description regarding the illustrated computing devices (e.g., the server(s) 106, the client device 118, the third-party system 116, the standardized-schema database 114, and/or the data-domain-specific database 115) is provided with respect to FIGS. 9 and 10 below.

As shown, the data domain schema system 102 utilizes the network 112 to communicate with the client device 118, and/or the third-party system 116. The network 112 may comprise any network described in relation to FIGS. 9-10. For example, the data domain schema system 102 communicates with the client device 118 to provide and receive information pertaining to user accounts, financial transactions, account balances, funds transfers, or other information. Indeed, the inter-network facilitation system 104 or the data domain schema system 102 can facilitate communication between various systems and client devices for performing network-based transactions. For example, data domain schema system 102 or the inter-network facilitation system 104 can transfer funds between user accounts or can utilize machine learning models to generate predictions for transaction success or for advanced trust-based account balances (e.g., amounts based on historical user account behavior and previous balances).

To facilitate the functions of the inter-network facilitation system 104, in some embodiments, the data domain schema system 102 communicates with different network components of the inter-network facilitation system 104, such as the third-party system 116, the standardized-schema database 114, and/or the data-domain-specific database 115. More specifically, the data domain schema system 102 generates and passes digital payloads between the datadomain-specific database 115 and the standardized-schema database 114. Indeed, the data domain schema system 102 can utilize the data-domain-specific database 115 as a source database to generate a digital payload having a source schema. In turn, the data domain schema system 102 can also utilize the standardized-schema database 114 as a target database to receive and process the digital payload having a target schema.

As indicated by FIG. 1, the client device 118 includes a client application. In many embodiments, the inter-network facilitation system 104 or the data domain schema system 102 communicates with the client device 118 through the client application to, for example, receive and provide information including data pertaining to user actions for logins, account registrations, metrics publications, metrics queries (or other client device information). In addition, the data domain schema system 102 generates digital payloads from requests obtained from the client device 118 and generates displayable information from digital payloads to provide to the client device 118 in return (e.g., after utilizing multiple network components to process the digital payloads to perform a network task such as editing, transforming, and publishing a metric).

As indicated above, the inter-network facilitation system 104 or the data domain schema system 102 can provide (and/or cause the client device 118 to display or render) visual elements within a graphical user interface associated with the client application. For example, the inter-network facilitation system 104 or the data domain schema system 102 can provide a graphical user interface that includes a login screen and/or an indication of successful or unsuccessful login. In some cases, the data domain schema system 102 provides user interface information for a user interface for performing a different user action such as a metric submission or a metric request. In some embodiments, the data domain schema system 102 determines where a user action (e.g., a login) is successful and/or permissible based on various account data and/or machine learning predictions.

Although FIG. 1 illustrates the environment having a particular number and arrangement of components associated with the data domain schema system 102, in some embodiments, the environment may include more or fewer components with varying configurations. For example, in some embodiments, the inter-network facilitation system 104 or the data domain schema system 102 can communicate directly with the client device 118, the third-party system 116, the standardized-schema database 114, and/or the data-domain-specific database 115, bypassing the network 112. In these or other embodiments, the inter-network facilitation system 104 or the data domain schema system 102 can be housed (entirely or in part) on the client device 118. Additionally, the inter-network facilitation system 104 or the data domain schema system 102 can include (e.g., house) the standardized-schema database 114 and/or the data-domain-specific database 115. Further, the inter-network facilitation system 104 can include more network components communicatively coupled together.

Figure 2:
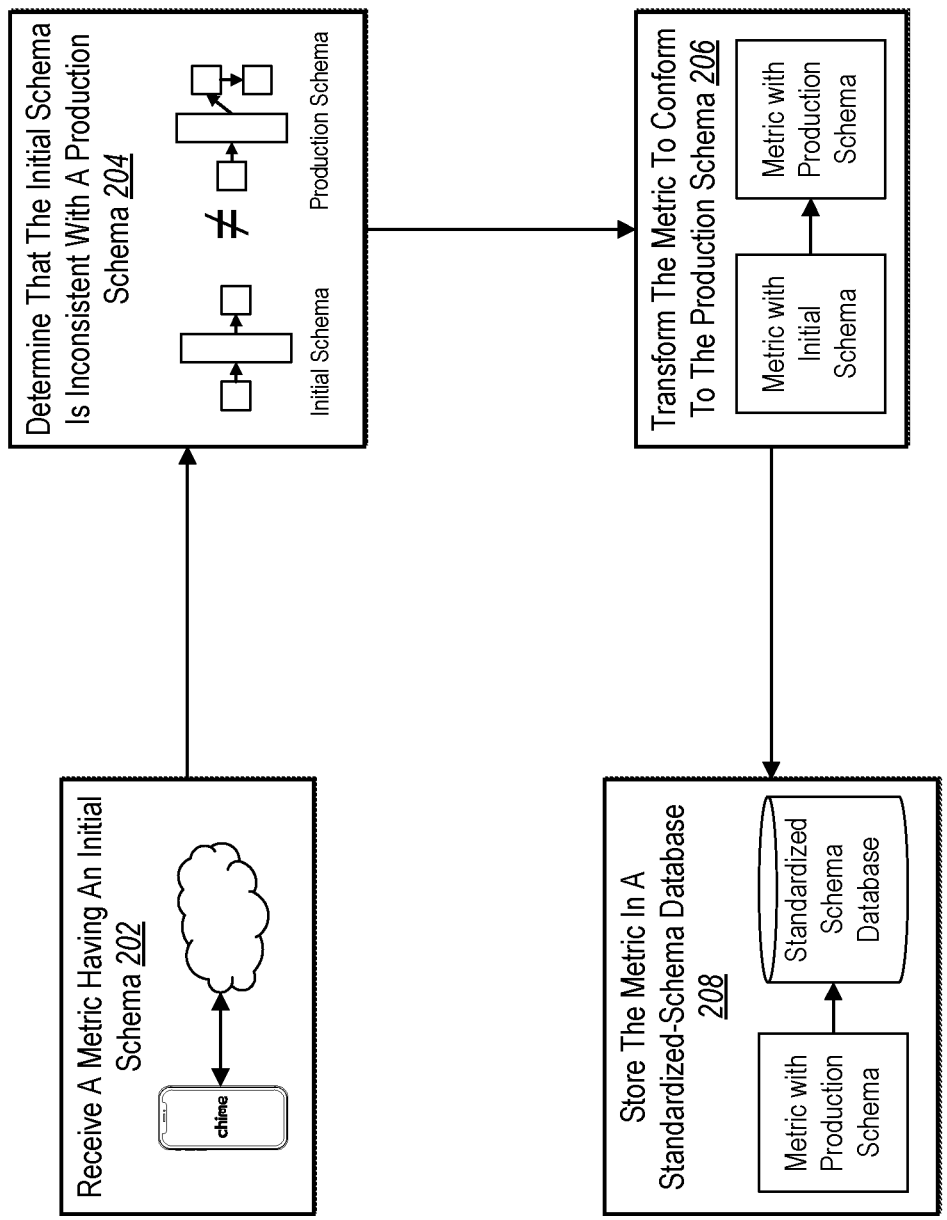
FIG. 2 illustrates an example overview of a series of acts for utilizing a data domain schema system to transform a metric to conform to a production schema in accordance with one or more embodiments.

As discussed above, in some embodiments, the data domain schema system 102 can harmonize and productionize metrics for cross-domain uniformity. For instance, FIG. 2 illustrates the data domain schema system 102 productionizing a metric in accordance with one or more embodiments. Specifically, FIG. 2 shows the data domain schema system 102 receiving a metric having an initial schema 202. The data domain schema system 102 determines that the initial schema is inconsistent with a production schema 204. Upon determining the inconsistent schemas, the data domain schema system 102 transforms the metric to conform to the production schema 206. When the metric conforms to the production schema, the data domain schema system 102 stores the metric in a standardized-schema database 208.

As mentioned, the data domain schema system 102 receives a metric having an initial schema 202. For example, the data domain schema system 102 retrieves a dataset from a first database, such as a data-domain-specific database, an ingestion database, or a staging database. For instance, as described further below, a client device may finalize a metric within a data-domain-specific database and submit the metric to the data domain schema system 102. The data domain schema system 102 receives the metric and performs operations to prepare the metric for storage within the standardized-schema database. The data domain schema system 102 evaluates the format of the metric to determine whether the metric conforms with a production schema of an appropriate data domain responsible for the metric.

As mentioned, the data domain schema system 102 evaluates whether the initial schema conforms to a production schema of the responsible data domain. For instance, the data domain schema system 102 may determine that the initial schema is inconsistent with the production schema 204. For example, the data domain schema system 102 determines that the metric has a denormalized variable, and that the denormalized variable should be normalized to conform the metric to the production schema specific to the data domain responsible for the metric.

Upon determining that the initial schema is inconsistent with the production schema 204, the data domain schema system 102 transforms the metric to conform to the production schema 206. For instance, the data domain schema system 102 normalizes the variables and/or tables within the metric to comport with the organizational parameters required by production schema of the data domain responsible for the metric. As part of the transformation of the metric, the data domain schema system 102 may verify that the metric follows the production schema. For example, the data domain schema system 102 verifies that the metric follows the appropriate production schema before storing the metric in a standardized-schema database 208.

As mentioned, the data domain schema system 102 stores the metric having the production schema in a standardized-schema database 208. The data domain schema system 102 maintains the standardized-schema database as a repository of data that has conforms to production requirements, thus ensuring quality and completeness of the stored data. For example, the data domain schema system 102 maintains a "core database" to which client devices request information relevant to decision-making (e.g., financial data, growth strategy data, risk data, analytics).

In some embodiments, the data domain schema system 102 transmits messages, such as push notifications, informing interested parties of the publication (i.e., storage into the standardized-schema database) of new data metrics. For example, the data domain schema system 102 announces to client devices within the enterprise that a newly productionized finance metric has been stored in the standardized-schema database. The data domain schema system 102 can condition the receipt of such announcements on whether a client device contains the appropriate permission settings, as defined by a security model of the data domain schema system 102.

Figure 3:
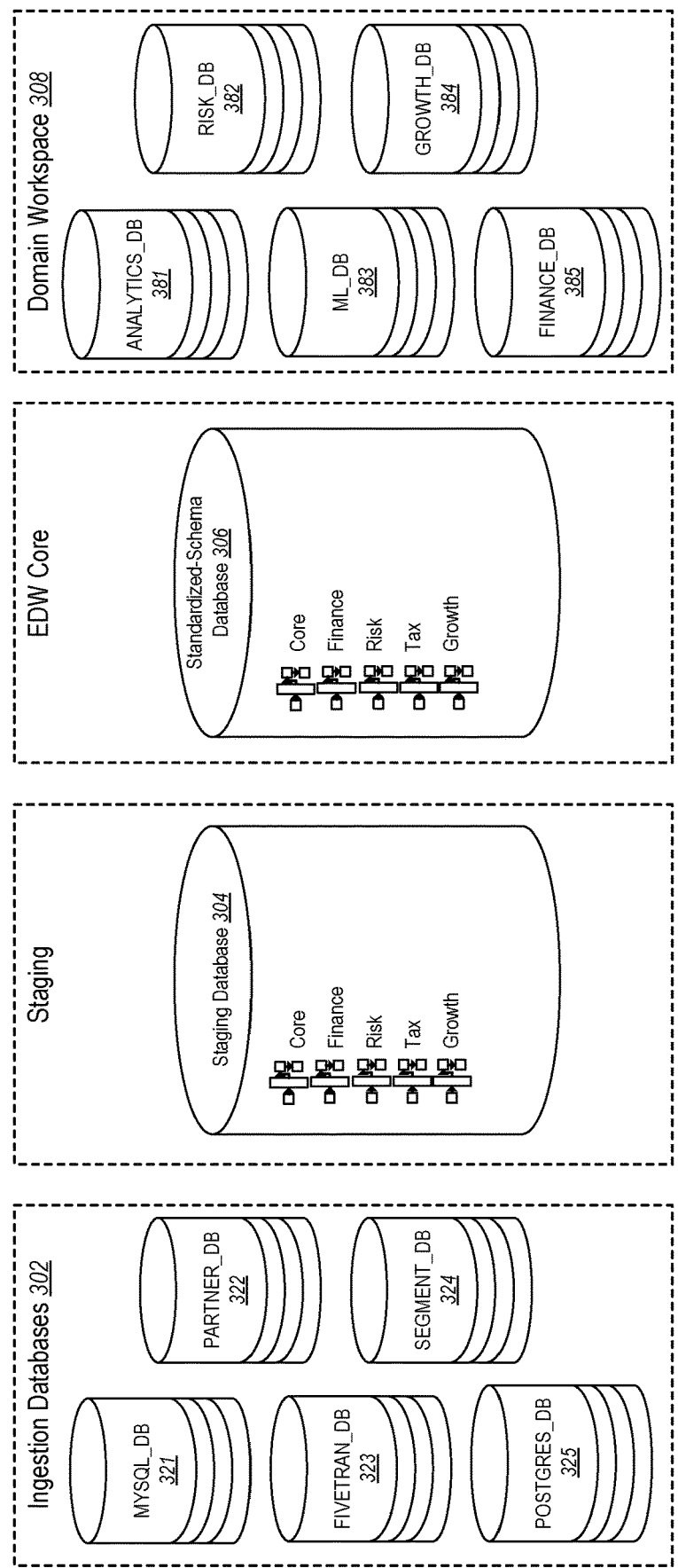
FIG. 3 illustrates a schematic diagram of a data domain schema system in accordance with one or more embodiments.

As discussed above, in some embodiments, the data domain schema system 102 can include multiple databases for developing, testing, and storing metrics. For instance, FIG. 3 illustrates an example architecture of the data domain schema system 102. In some embodiments, the data domain schema system 102 comprises ingestion databases 302, a staging database 304, a standardized-schema database 306, and a domain workspace 308.

The data domain schema system 102 utilizes the ingestion databases 302 to ingest data from external sources. For example, as shown in FIG. 3, the data domain schema system 102 receives data into the ingestion databases 302 from sources, such as MySQL, Fivetran, Segment, Postgres, or other data providers. The data domain schema system 102 utilizes service accounts to ingest data into the ingestion databases 302. The data domain schema system 102 can utilize a separate service account for each external source. In some embodiments, the data domain schema system 102 monitors the resources used to ingest data from each source, and assigns appropriately sized warehouses for ingestion.

The data domain schema system 102 can load data from each source into separate databases. Thus, the ingestion databases 302 can have sub-databases for organizing the ingestion of data. For example, the data domain schema system 102 loads data from a platform for collecting, cleaning, and activating customer data. For instance, the data domain schema system 102 utilizes Segment to load data metrics into database 324 "Segment DB." Similarly, the data domain schema system 102 can load data from a data integration service. For instance, the data domain schema system 102 utilizes Fivetran to load metrics into database 323 "Fivetran DB." The data domain schema system 102 can load data for each Fivetran connector having separate schemas. Alternatively, the data domain schema system 102 can create a single schema for some data from Fivetran, such as data stored in a web-based spreadsheet provider. Further, the data domain schema system 102 can organize and load data from a relational database management system using separate schemas. For instance, the data domain schema system 102 loads data from MySQL and/or PostgreSQL into database 321 "MySQL DB" or database 325 "Postgres DB." The data domain schema system 102 can load data from other data providers having separate schemas into database 322 "Partner DB." For providers that provide substantial amounts of data, the data domain schema system 102 can create separate databases to store ingested data from each additional provider.

Continuing through FIG. 3, the data domain schema system 102 utilizes the staging database 304 to store and hold intermediate tables in an extract-transform-load (ETL) process. For example, the data domain schema system 102 stores metrics associated with various divisions (e.g., finance, risk, tax, growth, etc.) that await transformation into a production schema. Upon transformation of a metric to conform with a production schema, the data domain schema system 102 moves the metric from the staging database 304 to the standardized-schema database 306.

The data domain schema system 102 utilizes the standardized-schema database 306 to store data that conforms to a production schema appropriate to that data. Multiple production schemas are contemplated by this disclosure for the standardized-schema database 306. For example, the data domain schema system 102 utilizes a core schema for enterprise-wide conformed facts and dimensions. For instance, the data domain schema system 102 utilizes a core schema for enterprise member profiles, time and time zones, geography, and transactions. Further, the data domain schema system 102 utilizes project schemas and/or product schemas that contain project-specific and/or product-specific data marts. For instance, the data domain schema system 102 utilizes marketing schemas for marketing data and finance schemas for finance data. For another instance, the data domain schema system 102 utilizes a SpotMe schema for managing SpotMe transactions. As illustrated in FIG. 3, other schemas are possible within the standardized-schema database, including risk schemas, tax schemas, growth schemas, etc.

As mentioned, the data domain schema system 102 may comprise a domain workspace 308. In some embodiments, the data domain schema system 102 utilizes the domain workspace 308 to house separate databases serving various divisions or teams within the enterprise. For example, and as explained further in connection with FIG. 4, the data domain schema system 102 may include an analytics data-domain-specific database 381 for the analytics division, a risk data-domain-specific database 382 for the risk division, a machine learning data-domain-specific database 383 for the machine learning and artificial intelligence division, a growth data-domain-specific database 384 for the growth division, and a finance data-domain-specific database 385 for the finance division. In some embodiments, the data domain schema system 102 utilizes the domain workspace 308 to serve data scientists, engineers, and analysts for creating a pipeline for specific domain needs. For instance, the data domain schema system 102 provides a data-domain-specific database for data scientists to develop, analyze, and test metrics within a data domain before the metrics are productionized and published to the standardized-schema database for enterprise-wide access. In some embodiments, the data domain schema system 102 utilizes multiple domain workspaces 308.

Figure 4:
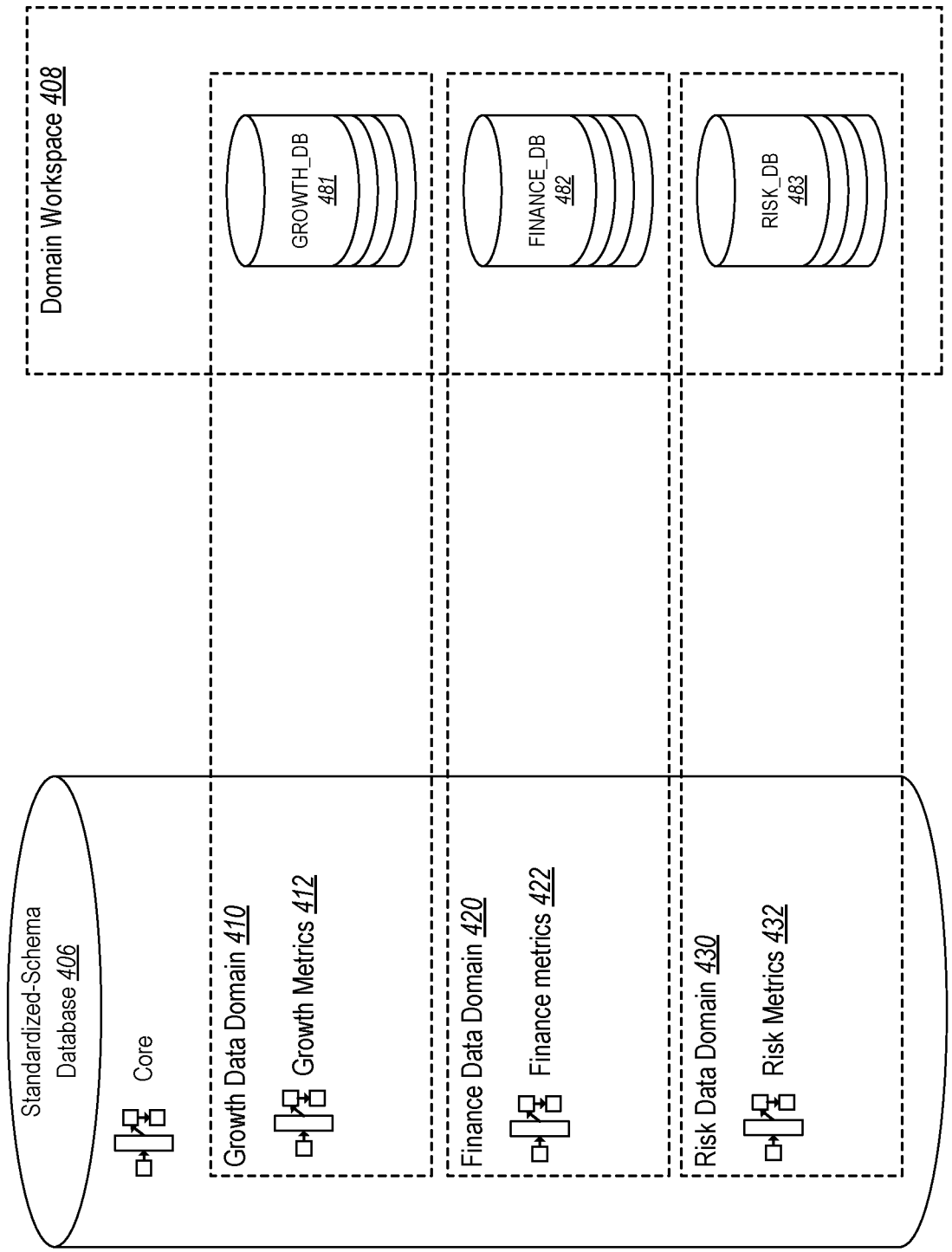
FIG. 4 illustrates a schematic diagram of a standardized-schema database and a domain workspace of a data domain schema system in accordance with one or more embodiments.

As discussed above, in some embodiments, the data domain schema system 102 includes multiple databases within the domain workspace and corresponding data domains. For instance, FIG. 4 illustrates an example architecture of the data domain schema system 102, with standardized-schema database 406 and domain workspace 408. Multiple data domains span the standardized-schema database 406 and the domain workspace 408. In this way, the data domains logically unite multiple parts of the data domain schema system 102, including the standardized-schema database 406 and the domain workspace 408. The data domain schema system 102 can allow access to and use of a data domain across an enterprise, subject to appropriate digital permissions. For example, a growth business division may control a growth data domain 410, which includes growth metrics 412 in the standardized-schema database 406, and the growth data-domain-specific database 481 in the domain workspace 408. Similarly, a finance business division may control a finance data domain 420, which includes finance metrics 422 in the standardized-schema database 406 and the finance data-domain-specific database 482 in the domain workspace 408. Likewise, a risk business division may control a risk data domain 430, which includes risk metrics 432 in the standardized-schema database 406 and the risk data-domain-specific database 483 in the domain workspace 408.

A data domain may include multiple databases and multiple schemas that serve different subdivisions within an enterprise or a set of computing devices that share common folders or a common domain, and the various databases and schemas within a data domain can have different access and/or permissions levels. For example, the data domain schema system 102 comprises several schemas within a particular data domain, including a test schema, an internal schema, a production schema for the domain workspace, and a production schema for the standardized-schema database.

A test schema in a particular data domain can be used to conduct tests, data research, and/or data experiments. For example, the data domain schema system 102 can create tables, delete tables, establish views, and run procedures in a test schema. The data domain schema system 102 may utilize executable instructions to generate metrics. For example, the data domain schema system 102 may create new data metrics within the test schema and run the new data metrics through a development process to prepare the metrics for production. The data domain schema system 102 may grant owner access to a development team, write access to a cross-functional data domain team, and read-only access to other teams or roles within the enterprise. For example, the data domain schema system 102 grants owner access of the finance data domain test schema to the finance division, and grants read-only access of the finance data domain test schema to the growth division.

An internal schema in a particular data domain can be used to conduct work that is confidential within that data domain. For example, the data domain schema system 102 can establish an internal schema for the finance data domain 420. The data domain schema system 102 can grant owner access of the finance internal schema to the finance division, while preventing client devices belonging to outside divisions, teams, users, or roles from having access to the finance internal schema. The data domain schema system 102 may grant access to the finance internal schema to other users based on need.

A production schema for the domain workspace can be used to store data that is generated through production data pipelines. For example, the data domain schema system 102 establishes a production schema for the domain workspace 408. The data domain schema system 102 can utilize the production schema for the domain workspace 408 to report information specific to a data domain. The data domain schema system 102 may grant administrative privileges and/or owner access of the production schema for the domain workspace 408 to a designated member of each team with a corresponding data-domain-specific database. The data domain schema system 102 may grant read-only access to other team members. The data domain teams have responsibility for data accuracy and data freshness.

A production schema for the standardized-schema database can be used to store data that is generated through production data pipelines by a data engineering team and/or data domain teams in some scenarios. For example, the data domain schema system 102 establishes a production schema for the standardized-schema database 406 to store metrics in the standardized-schema database 406. The data domain schema system 102 may utilize the production schema for the standardized-schema database 406 for reporting critical enterprise information. The data domain schema system 102 may restrict owner and write access of the production schema for the standardized-schema database 406, granting such access only to the data engineering team. The data domain schema system 102 may grant read-only access to the various cross-functional data domain teams. The data domain schema system 102 may require proposed changes to metrics in the standardized-schema database 406 to undergo a revision-controlled process, such as submission of a request, followed by a security and privacy review.

The data domain schema system 102 may additionally establish a sensitive schema for generating and storing sensitive data related to a particular data domain. The data domain schema system 102 may establish read and write permissions for the sensitive schema based on roles in the division responsible for the data domain.

Figure 5:
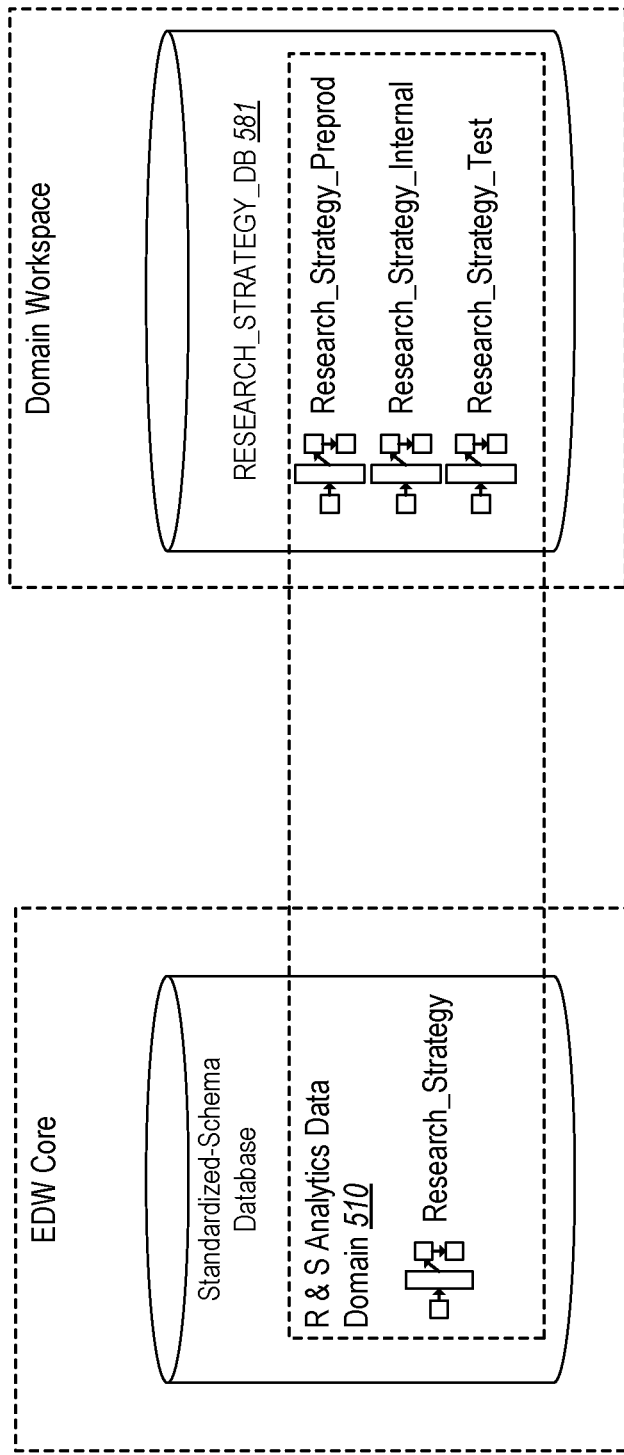
FIG. 5 illustrates a schematic diagram of another standardized-schema database and another domain workspace of a data domain schema system in accordance with one or more embodiments.

An example use-case of the data domain schema system 102 was performed based on a Research & Strategy (R&S) Analytics team request. FIG. 5 illustrates the data domain schema system 102 with an R&S Analytics data domain 510 and a research strategy database 581. The data domain schema system 102 established three new schemas corresponding to the research strategy database 581: a research strategy test schema, a research strategy internal schema, and a research strategy preproduction schema.

The data domain schema system 102 utilizes the research strategy test schema for testing and researching data metrics. The data domain schema system 102 utilizes the research strategy internal schema for research work specific to the R&S Analytics data domain 510. The data domain schema system 102 utilizes the research strategy preproduction schema for editing, finalizing, and/or productionizing research and strategy data, in preparation for storing the research and strategy data in the standardized-schema database. The data domain schema system 102 includes data pipelines for the R&S Analytics data domain 510 that assist the flow of data. Additionally, the data domain schema system 102 established a production schema for the standardized-schema database specific to the R&S Analytics data domain 510. The data engineering division maintains ownership of this production schema to create enterprise-wide, standardized datasets relating to research and strategy analytics.

In some embodiments, the data domain schema system 102 utilizes a role-based access control security model. For the use case illustrated in FIG. 5, the data domain schema system 102 established a research strategy role with object permissions granted as shown in the following table:

| Schema Name | Permissions | |
|---|---|---|
| | Read | Write |
| research_strategy_db.research_strategy_test | analyst<br>looker_role<br>research_strategy_role | research_strategy_role |
| research_strategy_db.research_strategy_internal | research_strategy_role | research_strategy_role |
| standardized_schema_db.research_strategy | research_strategy_role<br>analyst<br>looker_role | research_strategy_role |

Figure 6:
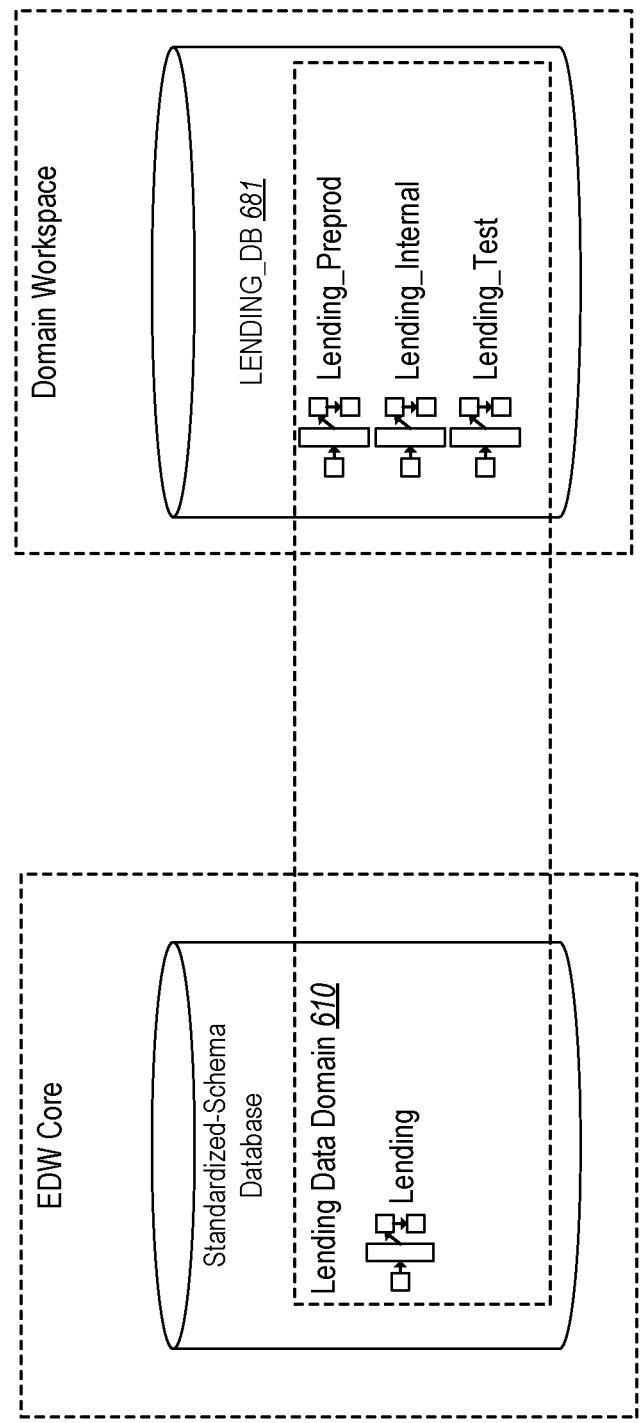
FIG. 6 illustrates a schematic diagram of another standardized-schema database and another domain workspace of a data domain schema system in accordance with one or more embodiments.

Another example use-case of the data domain schema system 102 was performed based on a Lending Product Analytics team request. FIG. 6 illustrates the data domain schema system 102 with a lending data domain 610 and a lending database 681. The data domain schema system 102 established three new schemas corresponding to the lending database 681: a lending test schema, a lending internal schema, and a lending preproduction schema.

The data domain schema system 102 utilizes the lending test schema for analyzing, testing, and storing temporary lending dimensions and fact tables. The data domain schema system 102 utilizes the lending internal schema for storing raw events and other raw data. The data domain schema system 102 utilizes the lending preproduction schema for editing, finalizing, and/or productionizing lending data, in preparation for storing the lending data in the standardized-schema database. The data domain schema system 102 includes data pipelines for the lending data domain 610 that are created and controlled by the Lending Product Analytics team. Additionally, the data domain schema system 102 established a production schema for the standardized-schema database specific to the lending data domain 610. The data engineering division maintains ownership of this production schema to create enterprise-wide, standardized datasets relating to lending products.

In some embodiments, the data domain schema system 102 utilizes a role-based access control security model. For the use case illustrated in FIG. 6, the data domain schema system 102 established a lending role with object permissions granted as shown in the following table:

| Schema Name | Permissions | |
|---|---|---|
| | Read | Write |
| lending_db.lending_test | analyst | analyst |
| | looker_role | looker_role |
| | risk_role | risk_role |
| | lending_role | lending_role |
| | lending_admin_role | lending_admin_role |
| lending_db.lending_internal | lending_role | lending_role |
| | lending_admin_role | lending_admin_role |
| lending_db.lending_preprod | analyst | |
| | looker_role | |
| | risk_role | |
| | lending_role | |
| | lending_admin_role | lending_admin_role |

Figure 7:
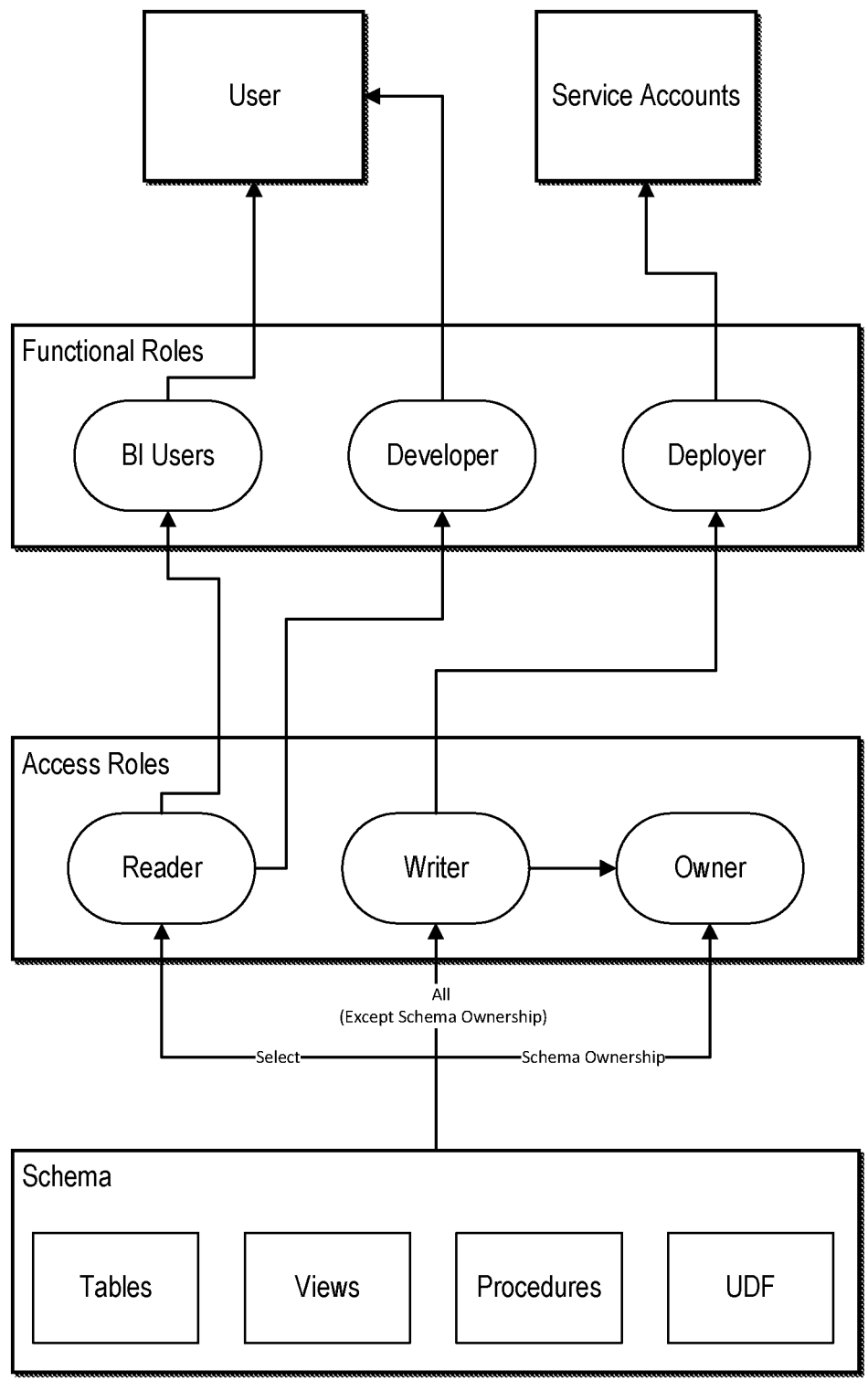
FIG. 7 illustrates a schematic diagram of an example security model for a data domain schema system in accordance with one or more embodiments.

As mentioned, in some embodiments, the data domain schema system 102 has a security model for enforcing security on the schema designs and maintaining integrity of the data metrics stored in the various databases. FIG. 7 illustrates an embodiment of a security model for the data domain schema system 102. For example, the data domain schema system 102 enforces a role-based access control security model that assigns roles to user devices in a role hierarchy. The data domain schema system 102 grants access privileges to a user device based on the roles of the user device. In some embodiments, each object within a database is owned by a role, rather than by a particular user device.

In some embodiments, each schema has three access roles associated with the schema: a reader role, a writer role, and an owner role. For the reader role, the data domain schema system 102 allows a user device to select tables and/or views to execute functions or stored procedures. For the writer role, the data domain schema system 102 allows a user device to create, drop, and alter objects in the schema. Generally, the data domain schema system 102 grants writer role access to service accounts. For the owner role, the data domain schema system 102 allows a user device to exercise all ownership rights of the schema, including granting access rights to other user devices. In some embodiments, the data domain schema system 102 requires all schemas to be managed schemas, meaning that devices with writer privileges (i.e., the owners of tables and views) cannot grant ownership privileges to others. Rather, in these embodiments, only the schema owner may grant ownership privileges. In some embodiments, the data domain schema system 102 grants access roles according to functional roles of teams and sub-teams.

Figure 8:
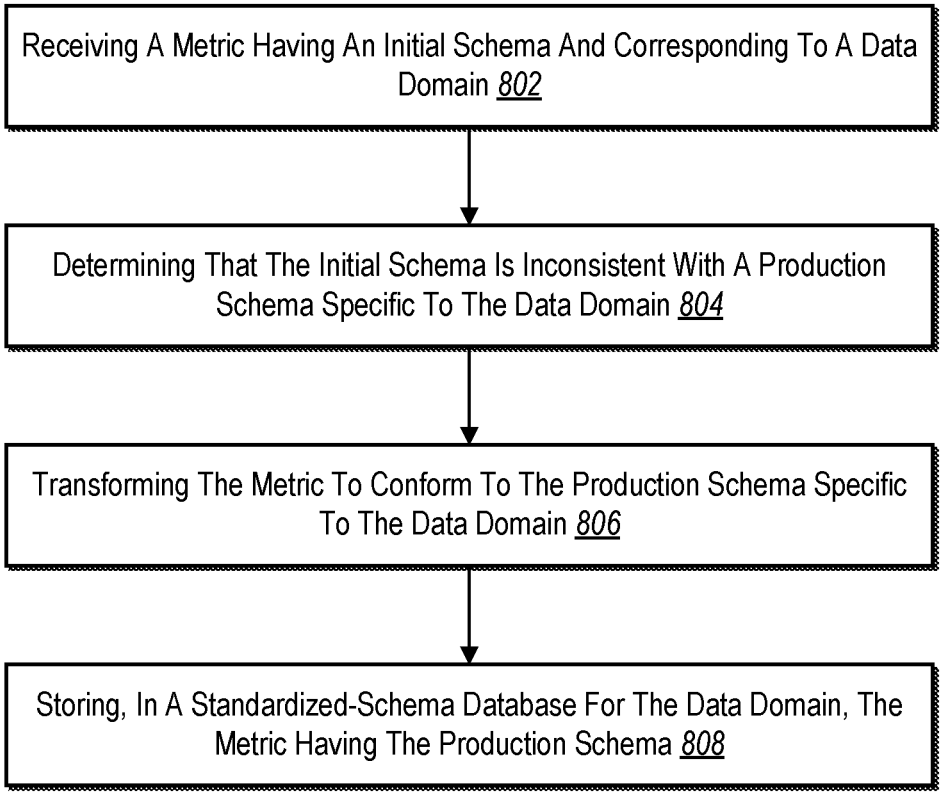
FIG. 8 illustrates a flowchart of a series of acts for transforming data metrics in accordance with one or more embodiments.

FIGS. 1-7, the corresponding text, and the examples provide a number of different methods, systems, devices, and non-transitory computer-readable media of the data domain schema system 102. In addition to the foregoing, one or more embodiments can also be described in terms of flowcharts comprising acts for accomplishing a particular result, as shown in FIG. 8. FIG. 8 may be performed with more or fewer acts. Further, the acts may be performed in differing orders. Additionally, the acts described herein may be repeated or performed in parallel with one another or parallel with different instances of the same or similar acts.

As mentioned, FIG. 8 illustrates a flowchart of a series of acts 800 for transforming metrics in accordance with one or more embodiments. While FIG. 8 illustrates acts according to one embodiment, alternative embodiments may omit, add to, reorder, and/or modify any of the acts shown in FIG. 8. The acts of FIG. 8 can be performed as part of a method. Alternatively, a non-transitory computer-readable medium can comprise instructions that, when executed by one or more processors, cause a computing device to perform the acts of FIG. 8. In some embodiments, a system can perform the acts of FIG. 8.

As shown in FIG. 8, the series of acts 800 includes an act 802 for receiving a metric having an initial schema and corresponding to a data domain. In particular, the act 802 can include retrieving the metric from an ingestion database, a staging database, or a data-domain-specific database. The series of acts 800 can further include utilizing executable instructions in a test schema to generate the metric. Additionally, the series of acts 800 can further include receiving an additional metric having an additional initial schema differing from the initial schema and corresponding to the data domain.

As also shown in FIG. 8, the series of acts 800 includes an act 804 for determining that the initial schema is inconsistent with a production schema specific to the data domain. The series of acts 800 can further include determining that the additional initial schema is inconsistent with the production schema specific to the data domain.

As further shown in FIG. 8, the series of acts 800 includes an act 806 for transforming the metric to conform to the production schema specific to the data domain. In particular, the act 806 can include storing, in a data-domain-specific database, the metric having the production schema specific to the data domain and storing, in an additional data-domain-specific database, an additional metric having an additional production schema specific to an additional data domain. The series of acts 800 can further include verifying that the metric follows the production schema before storing the metric in the standardized-schema database. The series of acts 800 can also include transforming the additional metric to conform to the production schema specific to the data domain.

As additionally shown in FIG. 8, the series of acts 800 includes an act 808 for storing, in a standardized-schema database for the data domain, the metric having the production schema. In particular, the act 808 can include the standardized-schema database storing data having the production schema specific to the data domain and storing additional data having an additional production schema specific to an additional data domain. Specifically, the act 808 can include storing, in the standardized-schema database, an additional metric having an additional production schema specific to an additional data domain.

The series of acts 800 can further include generating an owner role, a writer role, and a reader role for the initial schema.

Embodiments of the present disclosure may comprise or utilize a special purpose or general purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or generators and/or other electronic devices. When information is transferred, or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface generator (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In one or more embodiments, computer-executable instructions are executed on a general purpose computer to turn the general purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program generators may be located in both local and remote memory storage devices.

Embodiments of the present disclosure can also be implemented in cloud computing environments. In this description, "cloud computing" is defined as a subscription model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing subscription model can be composed of various characteristics such as, for example, on-demand self-service, broad network access, resource pooling, rapid elasticity, measured service, and so forth. A cloud-computing subscription model can also expose various service subscription models, such as, for example, Software as a Service ("SaaS"), a web service, Platform as a Service ("PaaS"), and Infrastructure as a Service ("IaaS"). A cloud-computing subscription model can also be deployed using different deployment subscription models such as private cloud, community cloud, public cloud, hybrid cloud, and so forth. In this description and in the claims, a "cloud-computing environment" is an environment in which cloud computing is employed.

Figure 9:
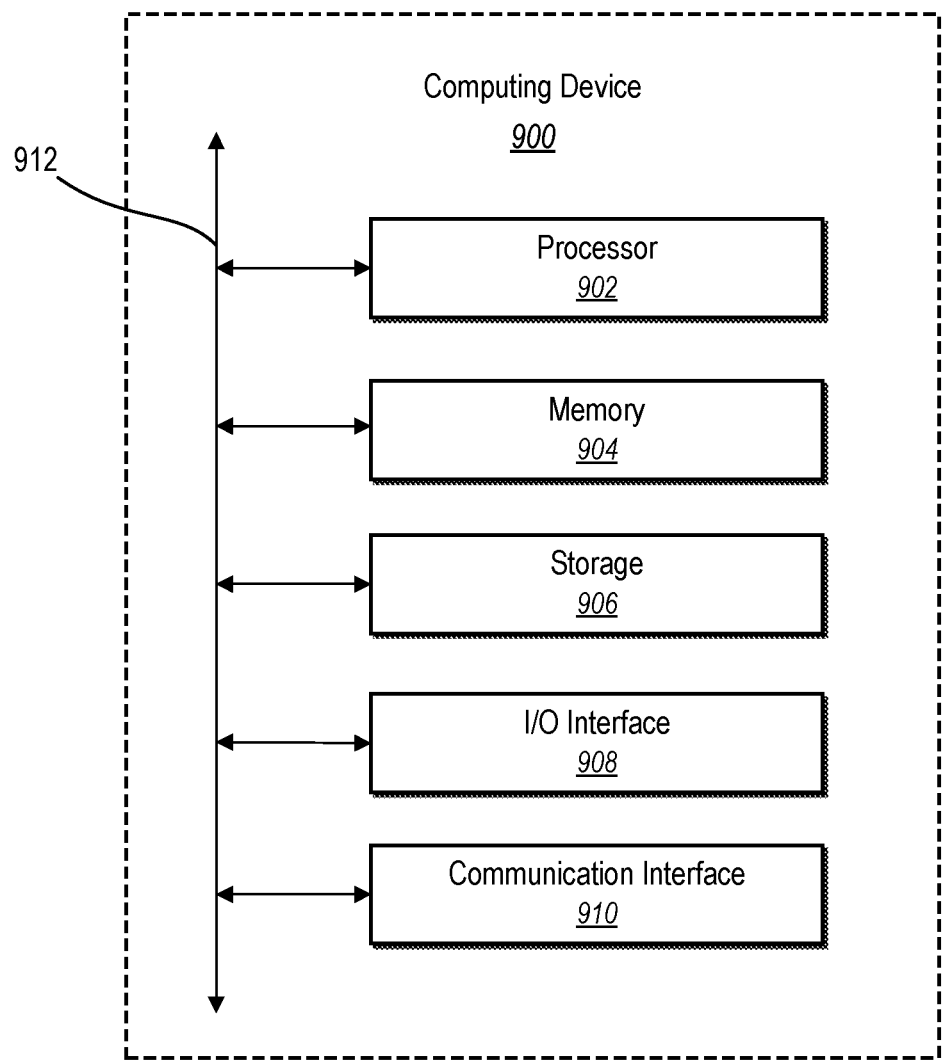
FIG. 9 illustrates a block diagram of an example computing device for implementing one or more embodiments of the present disclosure.

FIG. 9 illustrates a block diagram of an example computing device 900 that may be configured to perform one or more of the processes described above. One will appreciate that one or more computing devices, such as the computing device 900 may represent the computing devices described above (e.g., the server(s) 106, the third-party system 116, or the client device 118). In one or more embodiments, the computing device 900 may be a mobile device (e.g., a mobile telephone, a smartphone, a PDA, a tablet, a laptop, a camera, a tracker, a watch, a wearable device, etc.). In some embodiments, the computing device 900 may be a non-mobile device (e.g., a desktop computer or another type of client device). Further, the computing device 900 may be a server device that includes cloud-based processing and storage capabilities.

As shown in FIG. 9, the computing device 900 can include one or more processor(s) 902, memory 904, a storage device 906, input/output interfaces 908 (or "I/O interfaces 908"), and a communication interface 910, which may be communicatively coupled by way of a communication infrastructure (e.g., bus 912). While the computing device 900 is shown in FIG. 9, the components illustrated in FIG. 9 are not intended to be limiting. Additional or alternative components may be used in other embodiments. Furthermore, in certain embodiments, the computing device 900 includes fewer components than those shown in FIG. 9. Components of the computing device 900 shown in FIG. 9 will now be described in additional detail.

In particular embodiments, the processor(s) 902 includes hardware for executing instructions, such as those making up a computer program. As an example, and not by way of limitation, to execute instructions, the processor(s) 902 may retrieve (or fetch) the instructions from an internal register, an internal cache, memory 904, or a storage device 906 and decode and execute them.

The computing device 900 includes the memory 904, which is coupled to the processor(s) 902. The memory 904 may be used for storing data, metadata, and programs for execution by the processor(s). The memory 904 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 904 may be internal or distributed memory.

The computing device 900 includes the storage device 906 for storing data or instructions. As an example, and not by way of limitation, the storage device 906 can include a non-transitory storage medium described above. The storage device 906 may include a hard disk drive ("HDD"), flash memory, a Universal Serial Bus ("USB") drive or a combination these or other storage devices.

As shown, the computing device 900 includes one or more I/O interfaces 908, which are provided to allow a user to provide input to (such as user strokes), receive output from, and otherwise transfer data to and from the computing device 900. These I/O interfaces 908 may include a mouse, keypad or a keyboard, a touch screen, camera, optical scanner, network interface, modem, other known I/O devices or a combination of such I/O interfaces 908. The touch screen may be activated with a stylus or a finger.

The I/O interfaces 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 908 are configured to provide graphical data to a display for presentation to a user. The graphical data may be representative of one or more graphical user interfaces and/or any other graphical content as may serve a particular implementation.

The computing device 900 can further include a communication interface 910. The communication interface 910 can include hardware, software, or both. The communication interface 910 provides one or more interfaces for communication (such as, for example, packet-based communication) between the computing device and one or more other computing devices or one or more networks. As an example, and not by way of limitation, communication interface 910 may include a network interface controller ("NIC") or network adapter for communicating with an Ethernet or other wire-based network or a wireless NIC ("WNIC") or wireless adapter for communicating with a wireless network, such as a WI-FI. The computing device 900 can further include the bus 912. The bus 912 can include hardware, software, or both that connects components of computing device 900 to each other.

Each of the components of the data domain schema system 102 can include software, hardware, or both. For example, the components can include one or more instructions stored on a computer-readable storage medium and executable by processors of one or more computing devices, such as a client device or server device. When executed by the one or more processors, the computer-executable instructions of the data domain schema system 102 can cause the computing device(s) 900 to perform the methods described herein. Alternatively, the components can include hardware, such as a special purpose processing device to perform a certain function or group of functions. Alternatively, the components of the data domain schema system 102 can include a combination of computer-executable instructions and hardware.

Furthermore, the components of the data domain schema system 102 may, for example, be implemented as one or more operating systems, as one or more stand-alone applications, as one or more modules of an application, as one or more plug-ins, as one or more library functions or functions that may be called by other applications, and/or as a cloud-computing model. Thus, the components may be implemented as a stand-alone application, such as a desktop or mobile application. Furthermore, the components may be implemented as one or more web-based applications hosted on a remote server. The components may also be implemented in a suite of mobile device applications or "apps."

Figure 10:
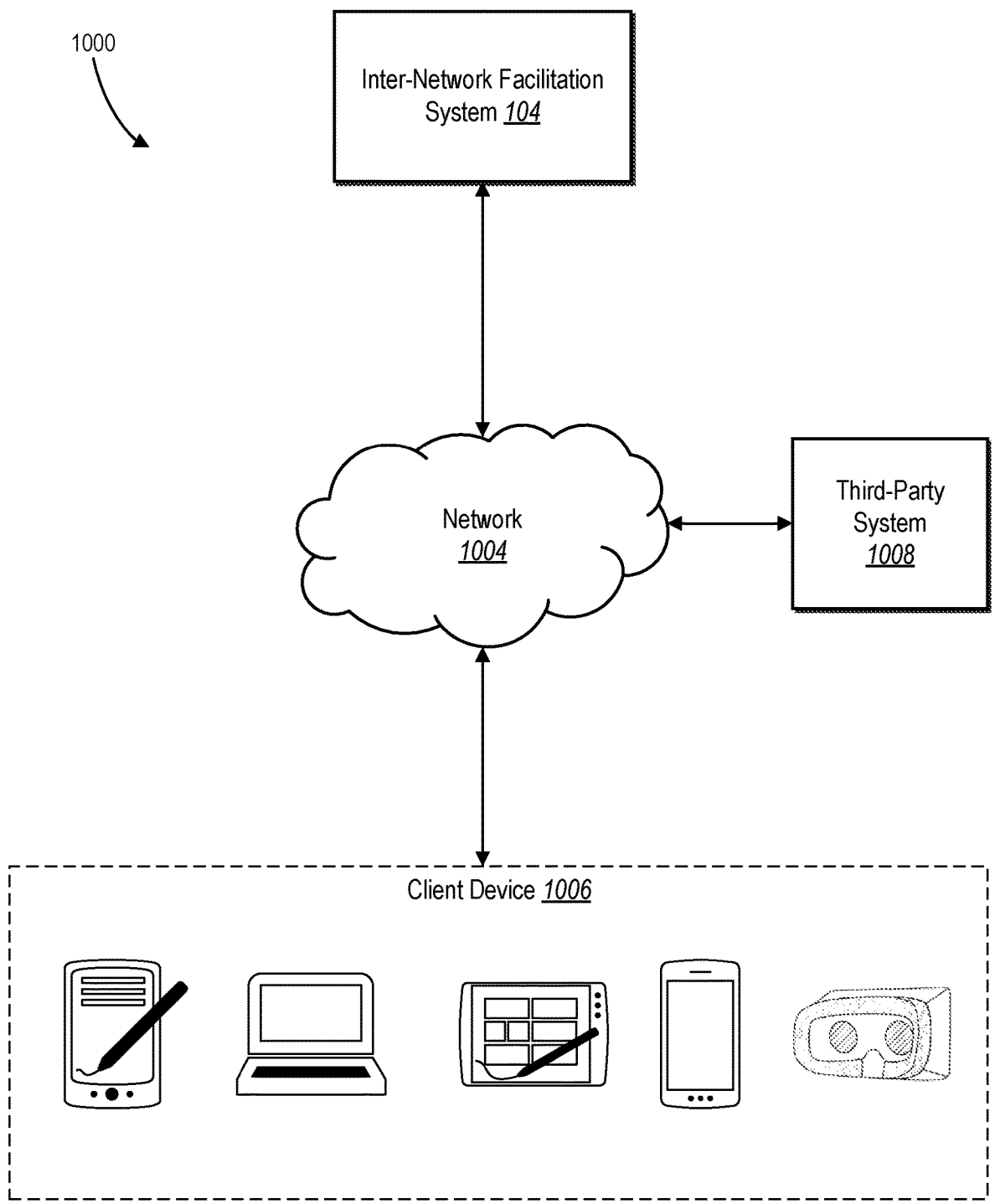
FIG. 10 illustrates an example environment for an inter-network facilitation system in accordance with one or more embodiments.

FIG. 10 illustrates an example network environment 1000 of the inter-network facilitation system 104. The network environment 1000 includes a client device 1006 (e.g., client device 118), an inter-network facilitation system 104, and a third-party system 1008 (e.g., the third-party system 116) connected to each other by a network 1004. Although FIG. 10 illustrates a particular arrangement of the client device 1006, the inter-network facilitation system 104, the third-party system 1008, and the network 1004, this disclosure contemplates any suitable arrangement of client device 1006, the inter-network facilitation system 104, the third-party system 1008, and the network 1004. As an example, and not by way of limitation, two or more of client device 1006, the inter-network facilitation system 104, and the third-party system 1008 communicate directly, bypassing network 1004. As another example, two or more of client device 1006, the inter-network facilitation system 104, and the third-party system 1008 may be physically or logically co-located with each other in whole or in part.

Moreover, although FIG. 10 illustrates a particular number of client devices 1006, inter-network facilitation systems 104, third-party systems 1008, and networks 1004, this disclosure contemplates any suitable number of client devices 1006, inter-network facilitation system 104, third-party systems 1008, and networks 1004. As an example, and not by way of limitation, network environment 1000 may include multiple client devices 1006, inter-network facilitation system 104, third-party systems 1008, and/or networks 1004.

This disclosure contemplates any suitable network 1004. As an example, and not by way of limitation, one or more portions of network 1004 may include an ad hoc network, an intranet, an extranet, a virtual private network ("VPN"), a local area network ("LAN"), a wireless LAN ("WLAN"), a wide area network ("WAN"), a wireless WAN ("WWAN"), a metropolitan area network ("MAN"), a portion of the Internet, a portion of the Public Switched Telephone Network ("PSTN"), a cellular telephone network, or a combination of two or more of these. Network 1004 may include one or more networks 1004.

Links may connect client device 1006, the inter-network facilitation system 104 (which hosts the data domain schema system 102), and third-party system 1008 to network 1004 or to each other. This disclosure contemplates any suitable links. In particular embodiments, one or more links include one or more wireline (such as, for example, Digital Subscriber Line ("DSL") or Data Over Cable Service Interface Specification ("DOCSIS"), wireless (such as for example Wi-Fi or Worldwide Interoperability for Microwave Access ("WiMAX"), or optical (such as for example Synchronous Optical Network ("SONET") or Synchronous Digital Hierarchy ("SDH") links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout the network environment 1000. One or more first links may differ in one or more respects from one or more second links.

In particular embodiments, the client device 1006 may be an electronic device including hardware, software, or embedded logic components or a combination of two or more such components and capable of carrying out the appropriate functionalities implemented or supported by client device 1006. As an example, and not by way of limitation, a client device 1006 may include any of the computing devices discussed above in relation to FIG. 9. A client device 1006 may enable a network user at the client device 1006 to access network 1004. A client device 1006 may enable its user to communicate with other users at other client devices 1006.

In particular embodiments, the client device 1006 may include a requester application or a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at the client device 1006 may enter a Uniform Resource Locator ("URL") or other address directing the web browser to a particular server (such as server(s) 106), and the web browser may generate a Hyper Text Transfer Protocol ("HTTP") request and communicate the HTTP request to the server. The server may accept the HTTP request and communicate to the client device 1006 one or more Hyper Text Markup Language ("HTML") files responsive to the HTTP request. The client device 1006 may render a webpage based on the HTML files from the server for presentation to the user. This disclosure contemplates any suitable webpage files. As an example, and not by way of limitation, webpages may render from HTML files, Extensible Hyper Text Markup Language ("XHTML") files, or Extensible Markup Language ("XML") files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, inter-network facilitation system 104 may be a network-addressable computing system that can interface between two or more computing networks or servers associated with different entities such as financial institutions (e.g., banks, credit processing systems, ATM systems, or others). In particular, the inter-network facilitation system 104 can send and receive network communications (e.g., via the network 1004) to link the third-party system 1008. For example, the inter-network facilitation system 104 may receive authentication credentials from a user to link a third-party system 1008 such as an online banking system to link an online bank account, credit account, debit account, or other financial account to a user account within the inter-network facilitation system 104. The inter-network facilitation system 104 can subsequently communicate with the third-party system 1008 to detect or identify balances, transactions, withdrawals, transfers, deposits, credits, debits, or other transaction types associated with the third-party system 1008. The inter-network facilitation system 104 can further provide the aforementioned or other financial information associated with the third-party system 1008 for display via the client device 1006. In some cases, the inter-network facilitation system 104 links more than one third-party system 1008, receiving account information for accounts associated with each respective third-party system 1008 and performing operations or transactions between the different systems via authorized network connections.

In particular embodiments, the inter-network facilitation system 104 may interface between an online banking system and a credit processing system via the network 1004. For example, the inter-network facilitation system 104 can provide access to a bank account of a third-party system 1008 and linked to a user account within the inter-network facilitation system 104. Indeed, the inter-network facilitation system 104 can facilitate access to, and transactions to and from, the bank account of the third-party system 1008 via a client application of the inter-network facilitation system 104 on the client device 1006. The inter-network facilitation system 104 can also communicate with a credit processing system, an ATM system, and/or other financial systems (e.g., via the network 1004) to authorize and process credit charges to a credit account, perform ATM transactions, perform transfers (or other transactions) between user accounts or across accounts of different third-party systems 1008, and to present corresponding information via the client device 1006.

In particular embodiments, the inter-network facilitation system 104 includes a model (e.g., a machine learning model) for approving or denying transactions. For example, the inter-network facilitation system 104 includes a transaction approval machine learning model that is trained based on training data such as user account information (e.g., name, age, location, and/or income), account information (e.g., current balance, average balance, maximum balance, and/or minimum balance), credit usage, and/or other transaction history. Based on one or more of these data (from the inter-network facilitation system 104 and/or one or more third-party systems 1008), the inter-network facilitation system 104 can utilize the transaction approval machine learning model to generate a prediction (e.g., a percentage likelihood) of approval or denial of a transaction (e.g., a withdrawal, a transfer, or a purchase) across one or more networked systems.

The inter-network facilitation system 104 may be accessed by the other components of network environment 1000 either directly or via network 1004. In particular embodiments, the inter-network facilitation system 104 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by the server. In particular embodiments, the inter-network facilitation system 104 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client device 1006, or an inter-network facilitation system 104, to manage, retrieve, modify, add, or delete the information stored in a data store.

In particular embodiments, the inter-network facilitation system 104 may provide users with the ability to take actions on various types of items or objects, supported by the inter-network facilitation system 104. As an example, and not by way of limitation, the items and objects may include financial institution networks for banking, credit processing, or other transactions, to which users of the inter-network facilitation system 104 may belong, computer-based applications that a user may use, transactions, interactions that a user may perform, or other suitable items or objects. A user may interact with anything that is capable of being represented in the inter-network facilitation system 104 or by an external system of a third-party system 1008, which is separate from inter-network facilitation system 104 and coupled to the inter-network facilitation system 104 via a network 1004.

In particular embodiments, the inter-network facilitation system 104 may be capable of linking a variety of entities. As an example, and not by way of limitation, the inter-network facilitation system 104 may enable users to interact with each other or other entities, or to allow users to interact with these entities through an application programming interface ("API") or other communication channels.

In particular embodiments, the inter-network facilitation system 104 may include a variety of servers, sub-systems, programs, modules, logs, and data stores. In particular embodiments, the inter-network facilitation system 104 may include one or more of the following: a web server, action logger, API-request server, transaction engine, cross-institution network interface manager, notification controller, action log, third-party-content-object-exposure log, inference module, authorization/privacy server, search module, user-interface module, user-profile (e.g., provider profile or requester profile) store, connection store, third-party content store, or location store. The inter-network facilitation system 104 may also include suitable components such as network interfaces, security mechanisms, load balancers, failover servers, management-and-network-operations consoles, other suitable components, or any suitable combination thereof. In particular embodiments, the inter-network facilitation system 104 may include one or more user-profile stores for storing user profiles and/or account information for credit accounts, secured accounts, secondary accounts, and other affiliated financial networking system accounts. A user profile may include, for example, biographic information, demographic information, financial information, behavioral information, social information, or other types of descriptive information, such as interests, affinities, or location.

The web server may include a mail server or other messaging functionality for receiving and routing messages between the inter-network facilitation system 104 and one or more client devices 1006. An action logger may be used to receive communications from a web server about a user's actions on or off the inter-network facilitation system 104. In conjunction with the action log, a third-party-content-object log may be maintained of user exposures to third-party-content objects. A notification controller may provide information regarding content objects to a client device 1006. Information may be pushed to a client device 1006 as notifications, or information may be pulled from client device 1006 responsive to a request received from client device 1006. Authorization servers may be used to enforce one or more privacy settings of the users of the inter-network facilitation system 104. A privacy setting of a user determines how particular information associated with a user can be shared. The authorization server may allow users to opt in to or to opt out of having their actions logged by the inter-network facilitation system 104 or shared with other systems, such as, for example, by setting appropriate privacy settings. Third-party-content-object stores may be used to store content objects received from third parties. Location stores may be used for storing location information received from client devices 1006 associated with users.

In addition, the third-party system 1008 can include one or more computing devices, servers, or sub-networks associated with internet banks, central banks, commercial banks, retail banks, credit processors, credit issuers, ATM systems, credit unions, loan associates, or brokerage firms, linked to the inter-network facilitation system 104 via the network 1004. A third-party system 1008 can communicate with the inter-network facilitation system 104 to provide financial information pertaining to balances, transactions, and other information, whereupon the inter-network facilitation system 104 can provide corresponding information for display via the client device 1006. In particular embodiments, a third-party system 1008 communicates with the inter-network facilitation system 104 to update account balances, transaction histories, credit usage, and other internal information of the inter-network facilitation system 104 and/or the third-party system 1008 based on user interaction with the inter-network facilitation system 104 (e.g., via the client device 1006). Indeed, the inter-network facilitation system 104 can synchronize information across one or more third-party systems 1008 to reflect accurate account information (e.g., balances, transactions, etc.) across one or more networked systems, including instances where a transaction (e.g., a transfer) from one third-party system 1008 affects another third-party system 1008.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with fewer or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A method comprising:
    receiving a first metric having a first initial schema and corresponding to a first data domain;
    receiving a second metric having a second initial schema and corresponding to a second data domain;
    determining that the first initial schema is inconsistent with a first production schema specific to the first data domain;
    determining that the second initial schema is inconsistent with a second production schema specific to the second data domain, wherein the second production schema is different from the first production schema;
    transforming the first metric to conform to the first production schema specific to the first data domain;
    transforming the second metric to conform to the second production schema specific to the second data domain; and
    storing, in a standardized-schema database, the first metric having the first production schema and the second metric having the second production schema.

2. The method of claim 1, wherein receiving the first metric comprises retrieving the first metric from an ingestion database, a staging database, or a data-domain-specific database.

3. The method of claim 1, further comprising utilizing executable instructions in a test schema to generate the first metric.

4. The method of claim 1, further comprising verifying that the first metric follows the first production schema before storing the first metric in the standardized-schema database.

5. The method of claim 1, further comprising receiving an additional metric having an additional initial schema differing from the first initial schema and corresponding to the first data domain.

6. The method of claim 5, further comprising determining that the additional initial schema is inconsistent with the first production schema specific to the first data domain.

7. The method of claim 6, further comprising transforming the additional metric to conform to the first production schema specific to the first data domain.

8. The method of claim 1, wherein the standardized-schema database stores data having the first production schema specific to the first data domain and stores additional data having an additional production schema specific to an additional data domain.

9. The method of claim 1, further comprising:
    storing, in a data-domain-specific database, the first metric having the first production schema specific to the first data domain; and
    storing, in an additional data-domain-specific database, an additional metric having an additional production schema specific to an additional data domain.

10. The method of claim 1, further comprising generating an owner role, a writer role, and a reader role for the first initial schema.

11. A system comprising:
    at least one processor; and
    a non-transitory computer readable medium comprising instructions that, when executed by the at least one processor, cause the system to:
    receive a first metric having a first initial schema and corresponding to a first data domain;
    receive a second metric having a second initial schema and corresponding to a second data domain;
    determine that the first initial schema is inconsistent with a first production schema specific to the first data domain;
    determine that the second initial schema is inconsistent with a second production schema specific to the second data domain, wherein the second production schema is different from the first production schema;
    transform the first metric to conform to the first production schema specific to the first data domain;
    transform the second metric to conform to the second production schema specific to the second data domain; and
    store, in a standardized-schema database, the first metric having the first production schema and the second metric having the second production schema.

12. The system of claim 11, further comprising instructions that, when executed by the at least one processor, cause the system to receive an additional metric having an additional initial schema differing from the first initial schema and corresponding to the first data domain.

13. The system of claim 12, further comprising instructions that, when executed by the at least one processor, cause the system to determine that the additional initial schema is inconsistent with the first production schema specific to the first data domain.

14. The system of claim 13, further comprising instructions that, when executed by the at least one processor, cause the system to transform the additional metric to conform to the first production schema specific to the first data domain.

15. The system of claim 11, further comprising instructions that, when executed by the at least one processor, cause the system to generate an owner role, a writer role, and a reader role for the first initial schema.

16. A non-transitory computer readable medium comprising instructions that, when executed by at least one processor, cause a computing device to:
    receive a first metric having a first initial schema and corresponding to a first data domain;
    receive a second metric having a second initial schema and corresponding to a second data domain;

determine that the first initial schema is inconsistent with a first production schema specific to the first data domain;

determine that the second initial schema is inconsistent with a second production schema specific to the second data domain, wherein the second production schema is different from the first production schema;

transform the first metric to conform to the first production schema specific to the first data domain;

transform the second metric to conform to the second production schema specific to the second data domain; and store, in a standardized-schema database, the first metric having the first production schema and the second metric having the second production schema.

17. The non-transitory computer readable medium of claim 16, further comprising instructions that, when executed by the at least one processor, cause the computing device to receive the first metric by retrieving the first metric from an ingestion database, a staging database, or a data-domain-specific database.

18. The non-transitory computer readable medium of claim 16, further comprising instructions that, when executed by the at least one processor, cause the computing device to utilize executable instructions in a test schema to generate the first metric.

19. The non-transitory computer readable medium of claim 16, further comprising instructions that, when executed by the at least one processor, cause the computing device to verify that the first metric follows the first production schema before storing the first metric in the standardized-schema database.

20. The non-transitory computer readable medium of claim 16, further comprising instructions that, when executed by the at least one processor, cause the computing device to store, in the standardized-schema database, an additional metric having an additional production schema specific to an additional data domain.

* * * * *